Patented Dec. 29, 1942

UNITED STATES PATENT OFFICE 2,306,775

PROCESS FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application August 17, 1940, Serial No. 353,127

13 Claims. (Cl. 252—341)

This invention relates to the resolution of petroleum emulsions, and has for its main object to provide a novel process for resolving petroleum emulsions of the water-in-oil type, that are commonly referred to as "cut oil," "rolly oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new compounds or compositions of matter, used as the treating agent or demulsifier of my process, represent amines, substituted ammonium salts, and quaternary ammonium compounds, in which there is directly joined to a nitrogen atom a radical of the kind derived from an ester obtained by reaction between an acid and a hydroxy high molal acid compound, for instance, a hydroxy fatty acid, or a hydroxy fatty acid ester; and such radical is derived directed at least hypothetically by the removal of a hydrogen atom attached to an acyl carbon atom of the acid which functions as such in the formation, or hypothetical formation, of the aforementioned ester.

If at least momentarily a radical of the kind described be indicated by the character D, then the class of materials herein contemplated include those in which the following structures appear:

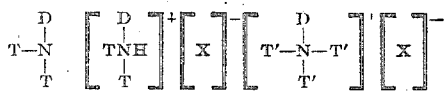

in which T represents hydrogen or any monovalent organic radical of the kind subsequently described, including D; T' represents any monovalent organic radical of the kind subsequently described, including D; and X indicates any suitable anion, including the hydroxyl group. The relation between the three structures indicated is readily appreciated by the fact that the quaternary ammonium compounds may be looked upon as a special type of substituted ammonium compounds, in which all four nitrogen-linked hydrogen atoms have been replaced by a monovalent organic radical. Furthermore, the amine type, i. e., the so-called trivalent nitrogen type, may be looked upon as a special type of substituted ammonium compound, to wit, the anhydride type, i. e., a type in which X of a substituted ammonium compound represents a hydroxyl group, and in which there is present at least one nitrogen atom-linked hydrogen atom, and in which the hydroxyl group and the aforementioned hydrogen atom were eliminated with the formation of water. In this sense, the relationship is comparable to that in which $NH_3$ is considered as an anhydride of $NH_4OH$. This may be illustrated in the conventional manner as follows:

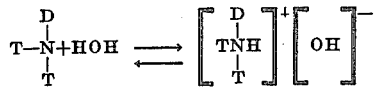

This group of compounds obviously has a community of chemical and physical properties; and this is particularly true when such compounds are employed in demulsification of crude oil emulsions of the water-in-oil type, for the reason that if an anhydride is employed, i. e., an amine showing the trivalent structure above illustrated, its is quite likely that contact with water must take place, since water or brine is a component of the emulsion to be resolved; and thus, on contact with water, one obtains the hydrated type, i. e., the substituted ammonium type.

For purposes of clarity, acetic acid will be used to illustrate the reactant which combines with a hydroxy high molal acid compound to produce a radical of the kind previously exemplified by D. The hydroxy high molal carboxy compound which contributes part of the structure of D, may be indicated by the formula

in which the OH radical indicated is the alcoholic hydroxyl radical such as appears in ricinoleic acid, hydroxy behenic acid, or the like; R represents the hydrocarbon part of the acyl radical indicated in complete form by OH.RCO; and T''' indicates the residual radical which, in combination with the acyl radical described, completes the hydroxylated high molal carboxy compound, and in the case of an acid, would be an OH group, in the case of a salt, would be the group OM, where M represents a metal, ammonium radical or amine radical; in the case of an ester, would be OT''', where T''' represents an alkyl radical, aralkyl radical, alicyclic radical, or the like, or might represent an amide form, or a substituted amide form, such as:

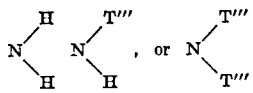

The ester form is not limited to the instances where OT''' is derived from a monohydric alcohol, but OT''' may be derived from a dihydric alcohol, such as a glycol or from a trihydric alcohol, such as glycerol, or alcohols containing more than three hydroxyl radicals, as, for example, diglycerol. Such residues may contain free hydroxyl radicals, as in the instance where ethylene glycol monoricinoleate is employed as the reactant, or may contain no free hydroxyl radicals, as in the instance where ethylene glycol diricinoleate, or triricinolein serve as the reactants.

Returning now to the reaction between acetic acid and such materials of the kind described, it becomes manifest that such reaction may be indicated in the following manner:

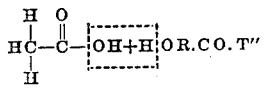

If, in a reaction of the kind above described, one employs chloracetic acid instead of acetic acid, the reaction is substantially the same and the product of reaction is substantially as follows:

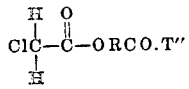

Such labile chlorine atom readily replaces a nitrogen-linked hydrogen atom present in ammonia and primary or secondary amines. In combination with a tertiary amine, there is formed a quaternary ammonium compound. These reactions may be illustrated briefly in the following manner:

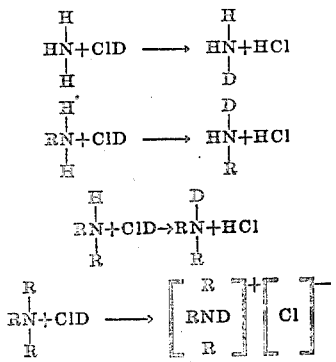

It is to be noted that the radical D, as previously indicated, denotes all of the aforementioned compounds except chlorine. In the above type reactions, needless to say, one mole of ammonia could combine with two or three moles of ClD; and one mole of a primary amine could combine with two moles of ClD. Other obvious variants of the reaction will be indicated subsequently.

Returning to the previous formulas, which have been designated by (A), it is to be noted that D can now be defined in terms of its component parts which enter into its formation, i. e., that part which is derived from a low molal or high molal acid acting as an acid, and that part derived from the high molal hydroxy acid, or acid compound acting as an alcohol. Thus, compounds of the type herein contemplated are essentially amines and substituted ammonium compounds in which a divalent radical obtained at least hypothetically by removal of a hydrogen atom directly linked to the carbon atom of an acyl radical, links a trivalent or pentavalent nitrogen atom to the alcoholiform oxygen atom of a high molal hydroxylated carboxy acid compound; said acyl radical being preferably of the low molol type, i. e., containing not over 6 carbon atoms; and said hydroxy acid compound being derived from an acid whose acyl radical contains not less than 8 and not more than 32 carbon atoms; and the remaining valences of the trivalent or pentavalent nitrogen may be satisfied in any suitable manner, including by means of hydrogen atoms, or the same type of radical just described, or by any monovalent radical, such as an alkyl radical, aralkyl radical, alicyclic radical, hydroxyalkyl radical, aromatic radical, alkyloxyalkylene radical, acylated hydrocarbon radical, such as an acyloxyalkylene radical; or the substituents may jointly form a ring in which the nitrogen atom is a component part; and in the case of pentavalent nitrogen, one valence may be satisfied by means of an anion, such as Cl, Br, OH, and the like.

As a simple illustration, reference is made to the reaction involving triricinolein, chloracetic acid and pyridine. This reaction, which exemplifies one product of the kind contemplated in the present invention, may be represented by the following reactions, where triricinolein and chloracetyl chloride are the reactants:

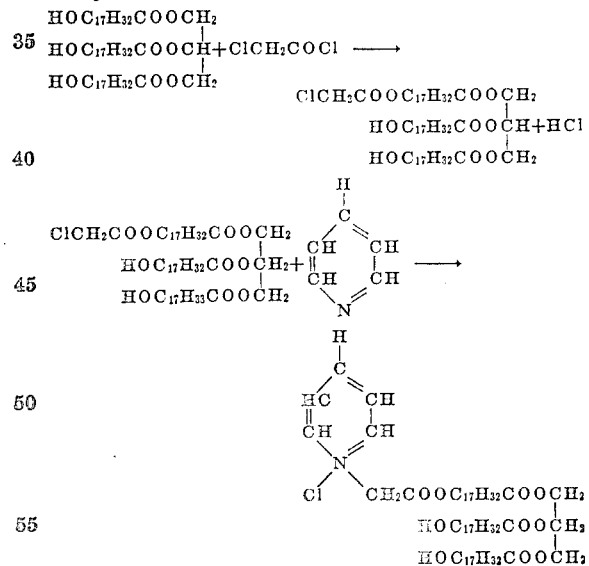

In the above reactions, triricinolein, the major component of castor oil, is one of the reactants in the first step, and chloracetyl chloride the other. In the second step, pyridine is the nitrogenous base which is combined with the halogen carboxylic acid ester.

In view of what has been said, it may be well to refer to a larger number of specific reactants of the three types which may enter into the formation of compounds of the kind herein contemplated and also to include a series of manufacturing procedures which yield a variety of such compounds.

While chloracetyl chloride is the preferred halogen carboxylic acid compound, other halogen acids, halogen substituted acyl halides, and esterifying derivatives are suitable, particularly α-halogen carboxylic acids of not over six carbon atoms. When the halogen is in the α-position to the CO group, the reaction seems to go with greater readiness. And with the shorter chain esterifying halogen carboxylic acids or their functional equivalents, especially chloracetyl chloride, the reaction goes with such ease that this may in fact, be considered an invention within the broader aspect. Other halogen acylating compounds which are suitable are, for example: α-chlorpropionic acid, α-bromstearic acid, α-bromoleic acid, or the acyl halides or anhydrides, corresponding to these acids.

Various hydroxy acids, which are representative of the types suitable for use in the manufacture of compounds of my invention are: hydroxy and alphahydroxy higher carboxylic, aliphatic and fatty acid, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alpha hydroxy margaric acid, alphahydroxy arachidic acid, aleuritic acid, rincinoleic acid, dichlorhydroxystearic acid, hydroxystearic acid, and the like. Esters, salts, amides, etc. of these aforesaid hydroxy higher carboxylic acids are suitable. Castor oil is the preferred reactant, because it is reactive, cheap, and yields a satisfactory demulsifier for crude oil emulsions. Although pyridine has been shown in the aforesaid reaction, the basic nitrogen compound is not limited to that. Various amines, including members of the alkyl, aralkyl, alicyclic, heterocyclic, aromatic, hydroxyalkylene, alkyloxyalkylene, and other amines are suitable. This does not mean that the reactions in each of these go with the same ease and rapidity. In addition to amines, ammonia may be used; but because of its gaseous nature, there are certain difficulties encountered with its use. For this reason, a non-gaseous nitrogen compound is preferred. Suitable amines and amino compounds include: pyridine, trimethylamine, tributylamine, triamylamine, triethanolamine, dimethyl aniline, dicyclohexylamine, piperidine, morpholine, diamylamine, ethyl benzylamine, octylamine, aniline, monoethanolamine, cyclohexylamine, etc.

The order of reactions need not be the same as above indicated. Instead of the order there indicated, chloracetic acid or the like could be first combined with the ammonia or the amine to form glycine or a nitrogen substituted glycine or betaine. This can then be esterified with the selected monohydroxy high molecular weight carboxylic acid or compound.

The following examples will further illustrate the nature of the materials, compounds or compositions of material intended to be used as the demulsifier of my process. The parts are by weight:

Example 1

8 parts of chloracetyl chloride were added slowly to 20 parts of castor oil, while stirring. After the first vigorous reaction had subsided, the mixture was placed under a reflux condenser and was stirred and heated on a steam plate for 6 hours. The evolved HCl gas was then swept out with dry air. Then 6 parts of pyridine were added to the mixture, which was thereupon warmed while stirring for a period of 4 hours. The product was a red, viscous oil which was nearly solid at room temperature. In water it formed a clear, viscous solution of low surface tension. The product was not precipitated from solution by alkali, alkaline earth-, or heavy metal salts.

Example 2

12 parts of chloracetyl chloride were added with stirring to 90 parts of castor oil. The mixture was warmed on the steam plate for 14 hours, purged of HCl with dry air, and then mixed with 8 parts of pyridine. This mixture was left on the steam plate over night. The product was a dark red oil, dispersible in water, and soluble in xylene. At least a predominant portion of this material consisted of a quaternary ammonium salt having the formula:

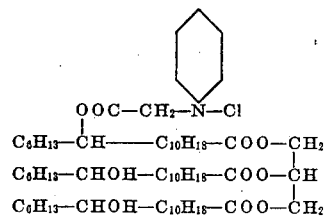

Example 3

31 parts of methyl ricinoleate were substituted for the 90 parts of castor oil in Example 2. The product was a viscous reddish oil, clearly soluble in water. A solution of this product had a strong flocculating action on clay suspensions.

Example 4

Hydroxystearic acid was substituted for methyl ricinoleate in Example 3, and sufficient excess pyridine was used to form a salt with the carboxyl of the hydroxystearic acid.

Example 5

The ethyl ester of aleuritic acid was substituted for methyl ricinoleate in Example 3.

Example 6

80 parts of α-bromstearyl chloride and 40 parts of diethylene glycol di-hydroxy octanoate were stirred and heated on the steam plate for 12 hours. 35 parts of tetraethyl ethylene diamine were added, and stirring and heating were continued for several hours. The product contained a large proportion of an amino quaternary ammonium salt of the formula:

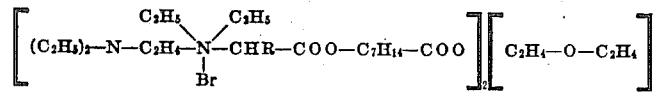

where R represents the $C_{16}H_{33}$ radical of stearic acid.

Example 7

37 parts of the 8-hydroxy octanoic acid ester of 8-brom octanoic acid were mixed with 25 parts of triethylamine and heated and stirred under a reflux condenser at 80–120° C. for 4 hours. The solid product contained a significant proportion of the salt of a betaine and has the probable formula:

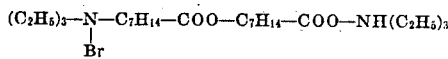

Example 8

11 parts of chloracetyl chloride were reacted with 30 parts of commercial castor oil as in Example 1. After the reaction was completed, 13 parts of dibutyl amine and 50 g. of pure benzene were added and the mixture refluxed for 5 hours. After evaporation of benzol, a reddish, semi-solid paste having slight solubility in water was obtained.

*Example 9*

18 parts of dicyclohexylamine were substituted for the 13 parts of dibutylamine in Example 8. The product was a nearly white crystalline mass.

*Example 10*

9 parts of morpholine were substituted for the 13 parts of dibutyl amine in Example 8.

Attention is directed to the fact that a material such as triricinolein can react with 1, 2, or 3 moles of chloracetyl chloride, so as to yield a mono-chloracetylated product, a di-chloracetylated product, or a tri-chloracetylated product. It is evident that the two latter products could be combined with two or three moles of amine, for example, with 2 or 3 moles of pyridine. Such types of compounds are contemplated as a part of the present invention, and are intended to be included within the scope of the hereto attached claims.

The most important exemplification of the present invention is concerned with the use of the quaternary ammonium compounds for resolving petroleum emulsions. It is to be noted that this type of material can be obtained from relatively inexpensive materials, such as, for example, chloracetic acid, tririncinolein (or ethyl ricinoleate), and pyridine or a crude pyridine which consists of pyridine and higher pyridine bases. I have found that this type of compound is particularly effective for breaking oil field emulsions. It will be noted, for this reason, that the majority of the hereto attached claims specifically refer to the quaternary ammonium type material.

The herein described compounds appear to react chemically like amines or polyamines and may therefore be employed like ordinary amines in many syntheses. Thus, the said compounds may have value as intermediates for the manufacture of other materials of a somewhat more complicated structure. For instance, a reactant derived from triricinolein, chloracetic acid, and pyridine might be reacted further with some other reagent, such as acetic anhydride, phthalic anhydride, or the like to produce some further or additional derivatives.

However, my present invention is restricted to the use of the compounds or materials herein described, and particularly with a quaternary ammonium type, as demulsifiers for water-in-oil emulsions, and more specifically, emulsions of water or brine in crude petroleum.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, when employed as demulsifiers for water-in-oil emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials herein described.

I desire to point out that the superiority of the reagent or demulsifying agent contemplated in my herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the desmulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Attention is directed to the fact that in the hereto attached claims, reference to the use of alpha halogen acids, such as chloracetic acid or the like, is intended to include the obvious functional equivalents, as noted, and especially the acyl chlorides such as chloracetic acid. It is also intended that the betaine type compound be included as a special type of quaternary compound, in which an acyl oxy radical functions both as an anion and hydrogen atom substituent.

Having thus described my invention, what I claim as new and desire to secure by Letters Patent is:

1. A process for breaking petroleum emulsions of the water-in-oil type, characterized by subjecting the emulsion to the action of a demulsifier comprising a chemical compound selected from the class consisting of amines and substituted ammonium compounds in which a divalent radical obtained at least hypothetically by removal of a hydrogen atom directly linked to the carbon atom of an acyl radical, links a nitrogen atom to the acyl alcoholiform oxygen atom of a high molal hydroxylated carboxy acid compound; and said hydroxy acid compound being derived from an acid whose acyl radical contains not less than 8 and not more than 32 carbon atoms; and the remaining nitrogen valences being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring, and anions.

2. A process for breaking petroleum emulsions of the water-in-oil type, characterized by subjecting the emulsion to the action of a demulsifier comprising a chemical compound selected from the class consisting of amines and substituted ammonium compounds in which a divalent radical obtained at least hypothetically by removal of a hydrogen atom directly linked to the carbon atom of an acyl radical, links a nitrogen atom to the acyl alcoholiform oxygen atom of a high molal hydroxylated carboxy acid compound; said first-mentioned acyl radical being of the low molal type containing not over 6 carbon atoms; and said hydroxy acid compound being derived from an acid whose acyl radical contains not less than 8 and not more than 32 carbon atoms; and the remaining nitrogen valances being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring, and anions.

3. A process for breaking petroleum emulsions of the water-in-oil type, characterized by subjecting the emulsion to the action of a demulsifier comprising a chemical compound selected from the class consisting of amines and substituted ammonium compounds in which a divalent radical obtained at least hypothetically by removal of a hydrogen atom directly linked to the carbon atom of an acyl radical, links a nitrogen atom to the acyl alcoholiform oxygen atom of a high molal hydroxylated carboxy acid compound; said first mentioned acyl radical being of the low molal type containing not over 6 carbon atoms; and said hydroxy acid compound being derived from an acid whose acyl radical contains not less than 8 and not more than 32 carbon atoms; and the remaining nitrogen valences being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring, and anions, selected from the class consisting of OH, Cl, Br, and I.

4. A process for breaking petroleum emulsions of the water-in-oil type, characterized by subjecting the emulsion to the action of a demulsifier comprising a substituted ammonium compound in which a divalent radical obtained at least hypothetically by removal of a hydrogen atom directly linked to the carbon atom of an acyl radical, links the ammonium nitrogen atom to the acyl alcoholiform oxygen atom of a high molal hydroxylated carboxy acid compound; said first mentioned acyl radical being of the low molal type containing not over 6 carbon atoms; said hydroxy acid compound being derived from an acid whose acyl radical contains not less than 8 and not more than 32 carbon atoms, and the remaining ammonium nitrogen valences being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring; and anions selected from the class consisting of OH, Cl, Br, and I.

5. A process for breaking petroleum emulsions of the water-in-oil type, characterized by subjecting the emulsion to the action of a demulsifier comprising a substituted ammonium compound in which a divalent radical obtained at least hypothetically by removal of a hydrogen atom directly linked to the carbon atom of an acyl radical, links the ammonium nitrogen atom to the acyl alcoholiform oxygen atom of a hydroxylated fatty acid compound; and said hydroxy acid compound being derived from an acid whose acyl radical contains not less than 8 carbon atoms and not more than 32 carbon atoms; said first mentioned acyl radical being of the low molal type containing not over 6 carbon atoms; and the remaining ammonium nitrogen valences being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring, and anions selected from the class consisting of OH, Cl, Br, and I.

6. A process for breaking petroleum emulsions of the water-in-oil type, characterized by subjecting the emulsion to the action of a demulsifier comprising a quaternary ammonium compound in which a divalent radical obtained at least hypothetically by removal of a hydrogen atom directly linked to the carbon atom of an acyl radical, links the ammonium nitrogen atom to the acyl alcoholiform oxygen atom of a hydroxylated fatty acid compound; and said hydroxy acid compound being derived from an acid whose acyl radical contains not less than 8 and not more than 32 carbon atoms; said first mentioned acyl radical being of the low molal type containing not over 6 carbon atoms; and the remaining ammonium nitrogen valences being satisfied in any suitable manner by a member of the class consisting of hydrogen atoms, the same type of radicals previously described, hydrocarbon radicals, hydroxy hydrocarbon radicals, acylated hydrocarbon radicals, ring structures in which the nitrogen atom is part of the ring; and anions selected from the class consisting of OH, Cl, Br, and I.

7. A process for breaking petroleum emulsions of the water-in-oil type, characterized by subjecting the emulsion to the action of a demulsifier comprising a pyridinium compound in which a divalent radical obtained at least hypothetically by removal of a hydrogen atom directly linked to the carbon atom of an acyl radical, links the ammonium nitrogen atom to the acyl alcoholiform oxygen atom of a hydroxylated fatty acid compound; and said hydroxy acid compound being derived from an acid whose acyl radical contains not less than 8 and not more than 32 carbon atoms; said first mentioned acyl radical being of the low molal type containing not over 6 carbon atoms; and the anions being selected from the class consisting of OH, Cl, Br, and I.

8. A process for breaking petroleum emulsions of the water-in-oil type, characterized by subjecting the emulsion to the action of a demulsifier comprising a pyridinium compound in which a divalent radical obtained at least hypothetically by removal of a hydrogen atom directly linked to the carbon atom of an acyl radical, links the ammonium nitrogen atom to the acyl alcoholiform oxygen atom of a ricinoleic acid compound; and said first mentioned acyl radical being of the low molal type containing not over 6 carbon atoms; and the anions being selected from the class consisting of OH, Cl, Br, and I.

9. A process for breaking petroleum emulsions of the water-in-oil type, characterized by subjecting the emulsion to the action of a demulsifier comprising a pyridinium compound in which a divalent radical obtained at least hypothetically by removal of a hydrogen atom directly linked to the carbon atom of an acyl radical, links the ammonium nitrogen atom to the acyl alcoholiform oxygen atom of a ricinoleic acid ester; and said first mentioned acyl radical being of the low molal type containing not over 6 carbon atoms; and the anions being selected from the class consisting of OH, Cl, Br, and I.

10. A process for breaking petroleum emulsions of the water-in-oil type, characterized by subjecting the emulsion to the action of a demulsifier comprising a pyridinium compound in which a divalent radical obtained at least hypothetically by removal of a hydrogen atom directly linked to the carbon atom of an acyl radical, links the ammonium nitrogen atom to the acyl alcoholiform oxygen atom of triricinolein; and said first mentioned acyl radical being of the low molal type containing not over 6 carbon atoms; and the anions being selected from the class consisting of OH, Cl, Br, and I.

11. A process for breaking petroleum emulsions of the water-in-oil type, characterized by subjecting the emulsion to the action of a demulsifier comprising a pyridinium compound in which a divalent radical obtained at least hypothetically by removal of a hydrogen atom directly linked to the carbon atom of an acyl radical, links the nitrogen atom to an alcoholiform oxygen atom of triricinolein; said acyl radical being of the low molal type containing not over 6 carbon atoms; and the anion being a halogen.

12. A process for breaking petroleum emulsions of the water-in-oil type, characterized by subjecting the emulsion to the action of a demulsifier comprising a pyridinium chloride compound in which a divalent radical obtained at least hypothetically by removal of a hydrogen atom directly linked to the carbon atom of an acyl radical, links the nitrogen atom to an alcoholiform oxygen atom of triricinolein; said acyl radical being of the low molal type containing not over 6 carbon atoms.

13. A process for breaking petroleum emulsions of the water-in-oil type, characterized by subjecting the emulsion to the action of a demulsifier comprising a chemical compound having the composition indicated by the structure:

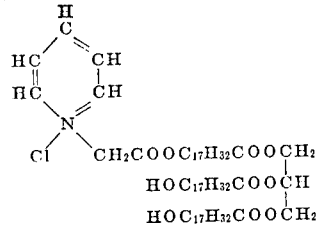

CHARLES M. BLAIR, JR.